United States Patent
Kuo et al.

(10) Patent No.: US 10,133,387 B2
(45) Date of Patent: Nov. 20, 2018

(54) FORCE SENSOR INTEGRATED CABLE MODULE AND PRESSURE SENSITIVE TOUCH SCREEN

(75) Inventors: Hsienhsien Kuo, Jhongli (CN); Fushen Chen, Taipei (CN)

(73) Assignee: TPK Touch Solutions Inc., Taipei (TW)

( * ) Notice: Subject to any disclaimer, the term of this patent is extended or adjusted under 35 U.S.C. 154(b) by 665 days.

(21) Appl. No.: 13/259,147

(22) PCT Filed: Dec. 3, 2009

(86) PCT No.: PCT/CN2009/001362
§ 371 (c)(1),
(2), (4) Date: Sep. 23, 2011

(87) PCT Pub. No.: WO2011/050506
PCT Pub. Date: May 5, 2011

(65) Prior Publication Data
US 2012/0026120 A1 Feb. 2, 2012

(30) Foreign Application Priority Data
Oct. 26, 2009 (CN) .......................... 2009 1 0206655

(51) Int. Cl.
*G06F 3/041* (2006.01)
(52) U.S. Cl.
CPC .................................. *G06F 3/0414* (2013.01)
(58) Field of Classification Search
CPC ....................................................... G06F 3/0414
USPC ........... 345/156, 173–183; 315/169.1–169.3; 178/18.01–18.03
See application file for complete search history.

(56) References Cited

U.S. PATENT DOCUMENTS

| 6,108,211 A * | 8/2000 | Diessner ....................... 361/751 |
| 6,492,979 B1 | 12/2002 | Kent et al. |
| 6,995,752 B2 | 2/2006 | Lu |
| 7,183,948 B2 | 2/2007 | Roberts |
| 7,196,694 B2 | 3/2007 | Roberts |
| 2002/0041482 A1* | 4/2002 | Sun et al. ..................... 361/681 |
| 2002/0149571 A1* | 10/2002 | Roberts ......................... 345/174 |
| 2002/0186209 A1* | 12/2002 | Cok ................................ 345/173 |
| 2005/0200298 A1* | 9/2005 | Ishibashi et al. ........... 315/169.1 |
| 2008/0079692 A1* | 4/2008 | Liang et al. .................. 345/156 |
| 2008/0158145 A1 | 7/2008 | Westerman |
| 2008/0211766 A1 | 9/2008 | Westerman et al. |
| 2009/0127004 A1* | 5/2009 | Nousiainen ................ 178/18.03 |

FOREIGN PATENT DOCUMENTS

| CA | 2355434 | 2/2002 |
| CN | 1502090 | 6/2004 |
| CN | 1502091 | 6/2004 |

(Continued)

*Primary Examiner* — Insa Sadio
(74) *Attorney, Agent, or Firm* — Cooper Legal Group, LLC

(57) ABSTRACT

The present invention is directed to an integrated cable module for force sensors adaptable to a pressure-sensitive touch panel. The module includes an integrated cable and a cable frame. Specifically, the integrated cable has signal lines for transferring sense signals of the force sensors. The integrated cable has a number of branches, and an assembling part that assembles the branches. The cable frame has an opening window, and has a groove used for placing the integrated cable.

29 Claims, 5 Drawing Sheets

(56) References Cited

FOREIGN PATENT DOCUMENTS

| | | |
|---|---|---|
| CN | 1582452 | 2/2005 |
| CN | 1596412 | 3/2005 |
| TW | 200739399 | 10/2007 |

* cited by examiner

FORCE SENSOR INTEGRATED CABLE MODULE AND PRESSURE SENSITIVE TOUCH SCREEN

BACKGROUND OF THE INVENTION

Field of the Invention

The present invention generally relates to a pressure-sensitive touch panel, and more particularly to an integrated cable module for force sensors.

Description of the Related Art

Touch panels or touch screens have been widely used in electronic devices, particularly portable and hand-held electronic devices such as personal digital assistants (PDA) and mobile telephones. Touch panels incorporate, sensing technology (such as pressure, resistive, capacitive, or optical sensing technology) and display technology. Maturing liquid crystal display (LCD) developments further facilitate the integration of the sensing technologies with the LCD.

FIG. 1 is an exploded view of a conventional pressure-sensitive touch panel. The force sensors 10 are commonly deposited on the metal chassis of a liquid crystal display (LCD) panel 12, and are covered with a touch glass 14. In locating the touch point, the sense signals of the force sensors 10 are transferred to the LCD panel 12 via distinct signal lines 16 respectively. As the sense signals are usually weak in magnitude, the sense signals transferred in the signal lines 16 are apt to be corrupted by the noise from the LCD panel 12. Further, as the signal lines 16 are routed and sorted in an irregular manner, the sense signals are affected by the noise with distinct degree respectively, therefore resulting-in non-uniformity in electricity and thus decreasing touch precision. According to the structure of the conventional pressure-sensitive touch panel, the integration of the force sensors 10 and the CLD panel 12 in a module makes the assembly and test inconvenient. Furthermore, it is inconvenient and time-consuming in maintenance by disassembling almost everything in the touch panel.

Accordingly, a need has thus arisen to propose a novel pressure-sensitive touch panel in order to improve the line sorting trouble and the electricity of the sense signals, and to facilitate the manufacture, test, assembly and maintenance.

SUMMARY OF THE INVENTION

In view of the foregoing, embodiments of the present invention provide a pressure-sensitive touch panel, particularly an integrated cable module for the force sensors, such that the line sorting between the force sensors and the liquid crystal module (LCM) may be regulated, and the electricity of the sense signals may be improved, and the manufacture, test, assembly and maintenance may become more convenient.

According to one embodiment of the present invention, a pressure-sensitive touch panel includes a touch glass, an integrated cable module and a liquid crystal module (LCM). Specifically, the integrated cable module includes a cable frame, an integrated cable and force sensors. The cable frame has an opening window, and a groove for depositing the integrated cable. The integrated cable has a number of branches and an assembling part for assembling the signal lines of the branches. The force sensors are deposited on the cable frame for sensing touch on the touch glass, and accordingly transfer the sense signals to the integrated cable. The LCM receives the sense signals from the assembling part of the integrated cable in order to locate a touch point.

BRIEF DESCRIPTION OF THE DRAWINGS

Many aspects of the present invention can be better understood with reference to the following drawings. The components in the drawings are not necessarily to scale, emphasis instead being placed upon clearly illustrating the principles of the present disclosures. Moreover, in the drawings, like reference numerals designate corresponding parts throughout the several views.

DETAILED DESCRIPTION OF THE INVENTION

Figure 1:
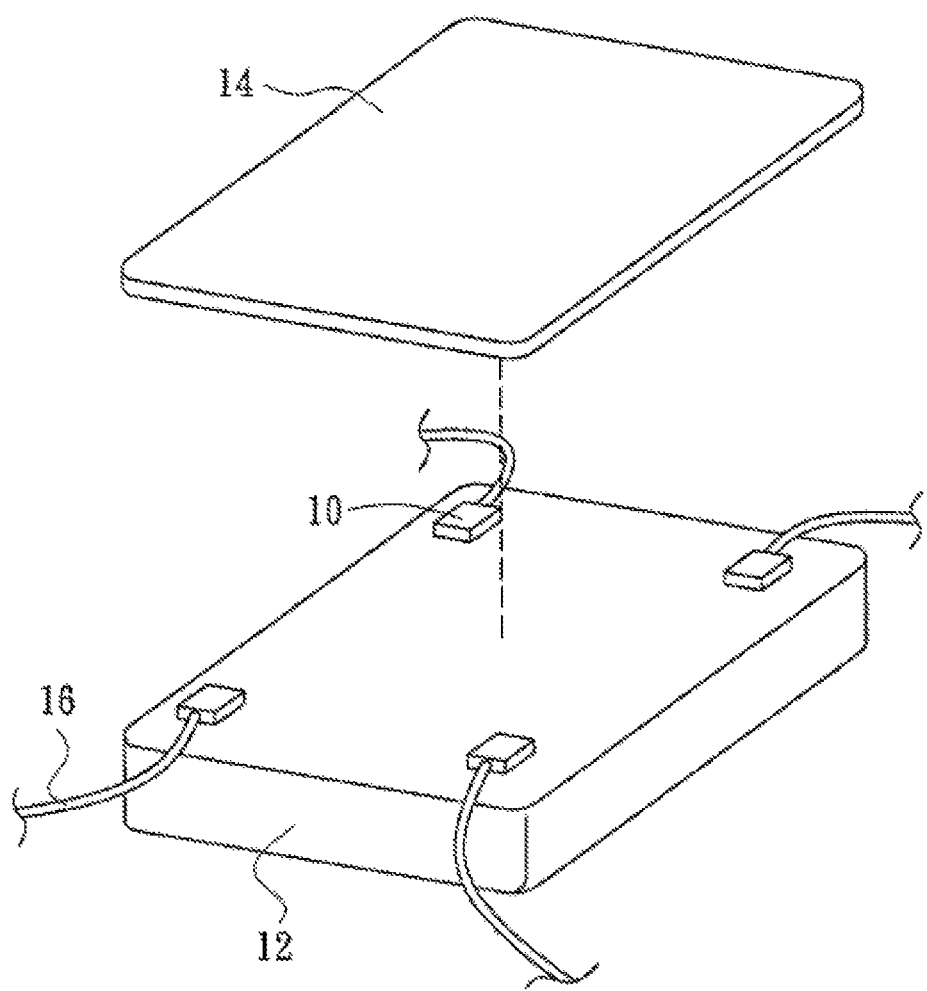
FIG. 1 is an exploded view of a conventional pressure-sensitive touch panel.
Figure 2:
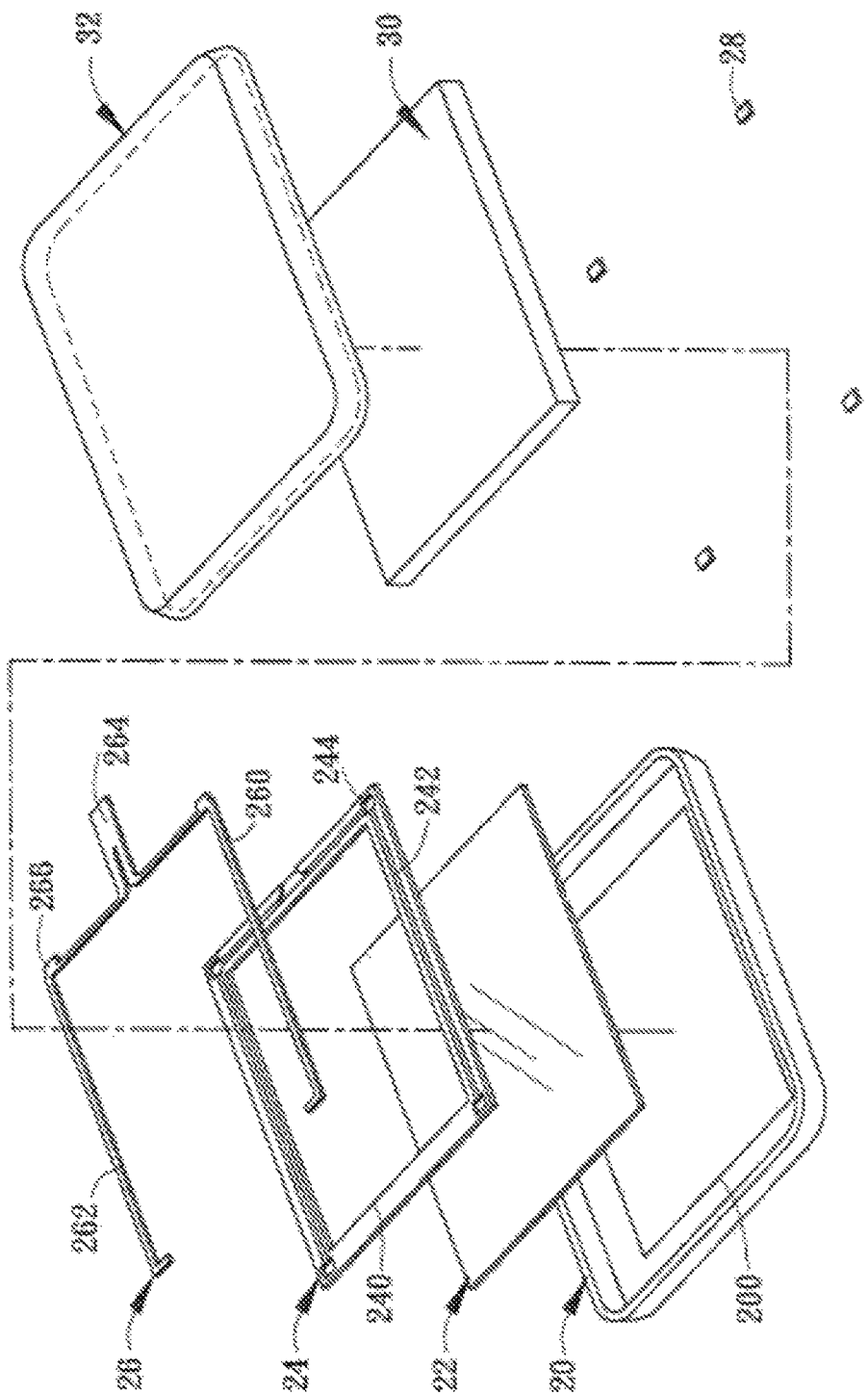
FIG. 2 is an exploded view of a pressure-sensitive touch panel according to one embodiment of the present invention.

FIG. 2 is an exploded view of a pressure-sensitive touch panel according to one embodiment of the present invention. In the embodiment, the pressure-sensitive touch panel (touch panel for short) includes composing elements in order: a front chassis 20, a touch glass 22, a cable frame 24, an integrated cable 26, force sensors 28, a liquid crystal module (LCM) 30 and a rear chassis 32.

The front chassis 20 has an opening window 200, which exposes a portion of the touch glass 22 and thus defines a touch area for facilitating user's touch. The front chassis 20 may be manufactured by, but not limited to, conventional plastic molding technique. A water-proof frame (not shown in FIG. 2) such as a water-proof plastic frame may be inserted between the front chassis 20 and the touch glass 22 in order to prevent water or foreign particles from entering the touch panel. The front chassis 20 collocates with the rear chassis 32, and the resultant space formed between them is used to accommodate the touch glass 22, the cable frame 24, the integrated cable 26, the force sensors 28 and the liquid crystal module (LCM) 30.

In the embodiment, the cable frame 24 is a planar frame having an opening window 240, which, but not necessarily, overlaps approximately the opening window 200 and has a size approximately equal to the size of the opening window 200. The cable frame 24 may be made-of, but not limited to, metal material. The surface of the cable frame 24 has a groove 242 for depositing the integrated cable 26. Although the groove 242 in the present embodiment is on the side away from the touch glass 22, the groove 242, however, may be on the side towards the touch glass 22 in another embodiment. The four corners of the cable frame 24 corresponding to the force sensors 28 have openings 244 respectively, through which the sense surface of the force sensor 28 may contact with the touch glass 22. Although the openings 244 are provided in the present embodiment, the openings 244, however, may be omitted, in another embodiment, by directly depositing the force sensors 28 on the cable frame 24 towards the touch glass 22.

In the embodiment, the integrated cable 26 is, but not limited to, a U-shaped flexible flat cable (FFC) or flexible printed circuit board (FPCB). Some advantages of using the FFC are its low contact resistivity, light, thin and flexible. As a result, the integrated cable 26 incurs little interference and effect with the cable frame 24 and the LCM 30. Furthermore, the FFC has less signal decay than other transmission lines. In the embodiment, the integrated cable 26 has two branches: a left branch 260 and a right branch 262, each of which is used to transfer the sense signals of two corresponding force sensors 28. The sense signals of the left-right branches 260/262 are gathered by an assembling part 264, and are then transferred to the LCM 30. Although the integrated cable 26 is U-shaped in the present embodiment, the integrated cable 26, however, may be closed in shape. The four corners of the integrated cable 26 corresponding respectively to the force sensors 28 may have protruded input/output interfaces 266, which are commonly known as golden fingers, through which signals may be transferred from or to the force sensors 28. Although the force sensors 28 are deposited on the four corners of the touch panel in the present embodiment, the positions of the force sensors 28 may not be limited to the four corners, and the quantity of the force sensors 28 may not be limited to four.

In the embodiment, the integrated cable 26 may be fastened to the groove 242 of the cable frame 24 by glue or adhesive tape, and the force sensors 28 may be fastened to the cable frame 24 via printed circuit board (PCB) (not shown in FIG. 2). Accordingly, the sense signals from the force sensors 28 may be transferred to the LCM 30, via the integrated cable 26, and those signals may then be processed by a processor and associated software/firmware in order to locate the touch point. According to the embodiment, as the transmission lines for transferring the sense signals are integrated in the single integrated cable 26, the line sorting trouble encountered in the conventional touch panel thus no longer exists. Further, as the weak signals are transferred through the single transmission media (i.e., the integrated cable 26), all sense signals are of uniform signal decay and electricity, thereby increasing touch precision. Furthermore, as the force sensors 28, the integrated cable 26 and the cable frame 24 are, integrated into a module, it becomes more convenient for manufacture, test and assembly, and maintenance also becomes convenient by removing only the integrated force sensors 28/integrated cable 26/cable frame 24.

Figure 3:
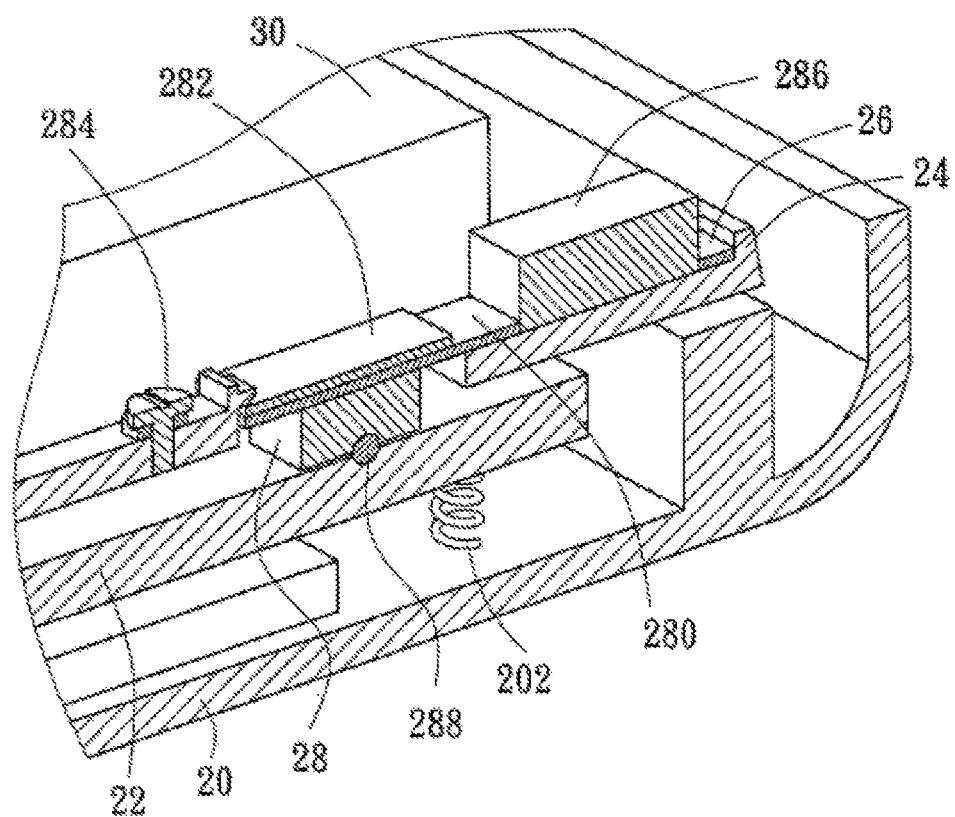
FIG. 3 shows a cross section of the touch panel according to the embodiment of the present invention.

FIG. 3 shows a cross section of the touch panel according to the embodiment of the present invention. The force sensor 28 is deposited on a printed circuit board 280, which is screwed on the cable frame 24 by a presser 282 and screw 284. In another embodiment, the force sensor 28 may be fastened to the cable frame 24 by means other than the presser 282 and the screw 284. The printed circuit board 280 may be connected to the integrated cable 26 via a connector 286. The sense surface of the force sensor 28 may have a ball 288 elastically touching the touch glass 22 facing towards the force sensor 28. The ball 288 therefore provides motion stroke between the touch glass 22 and the force sensor 28. FIG. 3 further shows a spring 202 fastened to inner surface of the front chassis 20 and against the touch glass 22.

Figure 4:
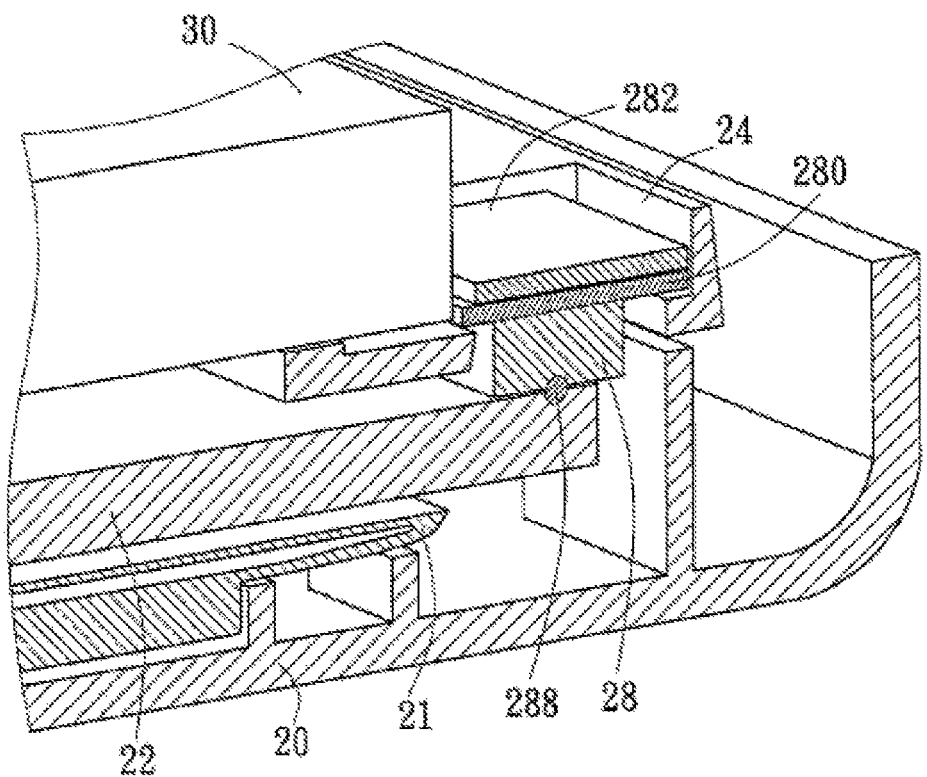
FIG. 4 shows another cross section of the touch panel according to the embodiment of the present invention.

FIG. 4 shows another cross section of the touch panel according to the embodiment of the present invention. This figure shows another orientation of the front chassis 20, the touch glass 22, the cable frame 24, the force sensors 28, the printed circuit board 280, the presser 282, the ball 288 and the LCM 30. Further, the figure shows a water-proof frame 21 deposited between the front chassis 20 and the touch glass 22 for preventing water or foreign particles from entering the touch panel.

Figure 5:
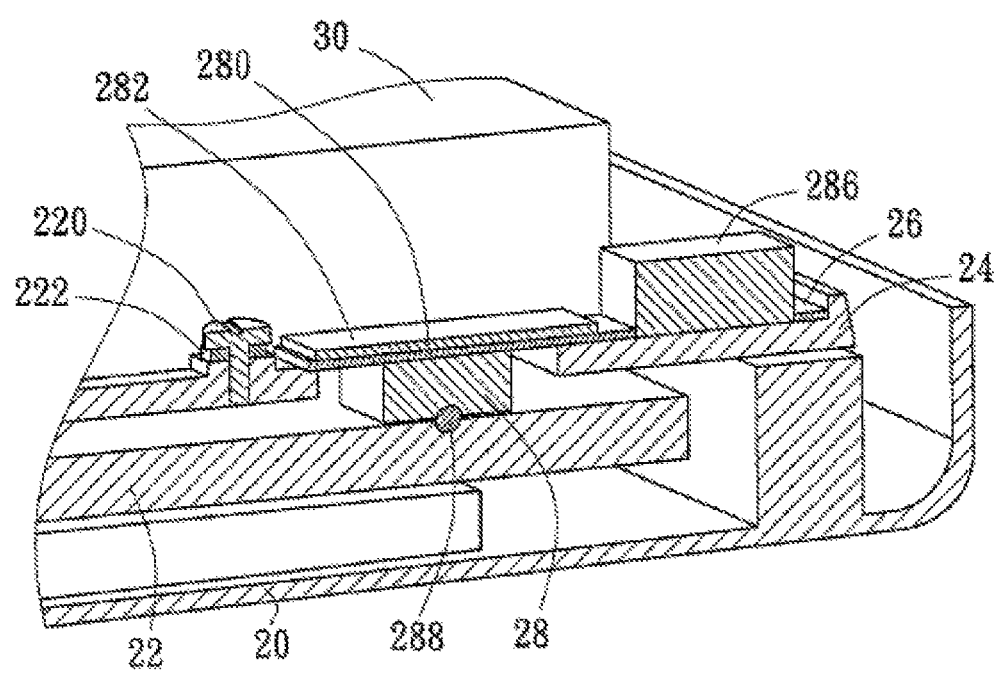
FIG. 5 shows a further cross section of the touch panel according to the embodiment of the present invention.

FIG. 5 shows a further cross section of the touch panel according to the embodiment of the present invention. This figure shows a further orientation of the front chassis 20, the touch glass 22, the cable frame 24, the integrated cable 26, the force sensors 28, the printed circuit board 280, the presser 282, the connector 286, the ball 288 and the LCM 30. Further, the figure shows a protection mechanism, that is, a protection screw 220 and a protection screw nut 222 in the present embodiment. The bottom of the protection screw 220 will be in contact with the touch glass 22 when user presses the touch glass 22 with a force beyond a predetermined amount, thereby protecting the force sensor 28 from being damaged.

Although specific embodiments have been illustrated and described, it will be appreciated by those skilled in the art that various modifications may be made without departing from the scope of the present invention, which is intended to be limited solely by the appended claims.

What is claimed is:

1. An integrated cable module for force sensors, comprising:
an integrated cable comprising a plurality of signal lines for transferring sense signals from a plurality of the force sensors respectively, the plurality of signal lines of the integrated cable divided into a plurality of branches, the plurality of branches gathered at an assembling part for assembling the plurality of signal lines of the plurality of branches, wherein the plurality of branches of the integrated cable are symmetric about the assembling part of the integrated cable; and
a cable frame defining an opening window which is encompassed by the cable frame, the cable frame having a groove for depositing the plurality of branches and the assembling part of the integrated cable, wherein the cable frame has openings respectively at positions corresponding to each of the force sensors.

2. The module of claim 1, wherein the integrated cable is U-shaped.

3. The module of claim 1, wherein the integrated cable is a flexible flat cable (FFC) or a flexible printed circuit board (FPCB).

4. The module of claim 1, wherein the plurality of branches of the integrated cable comprise a left branch and a right branch, each of which transfers the sense signals of two of the force sensors.

5. The module of claim 1, wherein the integrated cable comprises a plurality of input/output interfaces configured to transfer signals from or to the force sensors.

6. The module of claim 1, wherein the integrated cable is fastened to the groove of the cable frame by glue or adhesive tape.

7. The module of claim 1, further comprising a printed circuit board configured to couple at least one of the force sensors to the cable frame.

8. The module of claim 7, further comprising a presser for fastening the printed circuit board to the cable frame.

9. The module of claim 7, further comprising a connector configured to couple the printed circuit board to the integrated cable.

10. The module of claim 1, further comprising a protection scheme disposed on the cable frame.

11. The module of claim 10, wherein the protection scheme comprises a protection screw and a protection screw nut, wherein the protection screw prevents the force sensors from being damaged when a user exerts a force beyond a predetermined amount.

12. A pressure-sensitive touch panel, comprising:
a touch glass;
a cable frame deposited on the touch glass, the cable frame defining an opening window which is encompassed by the cable frame, the cable frame further having a groove;
an integrated cable deposited in the groove, the integrated cable comprising a plurality of signal lines, the plurality of signals lines of the integrated cable divided into a plurality of branches, the plurality of branches gathered at an assembling part for assembling the plurality of signal lines of the plurality of branches, wherein the plurality of branches are symmetric about the assembling part;
a plurality of force sensors deposited on the cable frame, the plurality of force sensors sensing touch on the touch glass and then transferring sense signals to the plurality of signal lines of the integrated cable, wherein the cable frame has openings respectively at positions corresponding to each of the plurality of force sensors such that the plurality of force sensors contact with and sense the touch on the touch glass through the openings; and
a liquid crystal module (LCM) configured to receive the sense signals from the assembling part of the integrated cable.

13. The touch panel of claim 12, wherein the groove is on a side of the cable frame facing away from the touch glass.

14. The touch panel of claim 12, wherein the integrated cable is fastened to the groove of the cable frame by glue or adhesive tape.

15. The touch panel of claim 12, wherein the integrated cable is U-shaped.

16. The touch panel of claim 12, wherein the integrated cable is a flexible flat cable (FTC) or a flexible printed circuit board (FPCB).

17. The touch panel of claim 12, wherein the plurality of branches of the integrated cable comprise a left branch and a right branch, each of which transfers the sense signals of two of the plurality of force sensors.

18. The touch panel of claim 12, wherein the integrated cable comprises a plurality of input/output interfaces configured to transfer signals from or to the plurality of force sensors.

19. The touch panel of claim 12, further comprising a printed circuit board configured to couple at least one of the plurality of force sensors to the cable frame.

20. The touch panel of claim 19, further comprising a presser for fastening the printed circuit board to the cable frame.

21. The touch panel of claim 19, further comprising a connector configured to couple the printed circuit board to the integrated cable.

22. The touch panel of claim 12, further comprising a protection scheme disposed on the cable frame.

23. The touch panel of claim 22, wherein the protection scheme comprises a protection screw and a protection screw nut, wherein a bottom of the protection screw contacts the touch glass in order to prevent the plurality of force sensors from being damaged when a user exerts a force beyond a predetermined amount.

24. The touch panel of claim 12, wherein at least one of the plurality of force sensors comprises a ball elastically touching and facing towards the touch glass, thereby providing motion stroke between the touch glass and the at least one of the plurality of force sensors.

25. The touch panel of claim 12, further comprising:
a front chassis having an opening window, wherein the opening window exposes a portion of the touch glass and defines a touch area; and
a rear chassis, wherein a space formed between the front chassis and the rear chassis accommodates the touch glass, the cable frame, the integrated cable, the plurality of force sensors and the LCM.

26. The touch panel of claim 25, further comprising a water-proof frame deposited between the front chassis and the touch glass, wherein the water-proof frame prevents water or foreign particles from entering the space between the front chassis and the rear chassis.

27. The touch panel of claim 25, further comprising a spring fastened to an inner surface of the front chassis and against the touch glass.

28. A pressure-sensitive touch panel, comprising:
a touch glass;
a cable frame deposited on the touch glass, the cable frame defining an opening window which is encompassed by the cable frame, the cable frame further having a groove;
an integrated cable deposited in the groove, the integrated cable comprising a plurality of signal lines, the plurality of signals lines of the integrated cable divided into a plurality of branches, the plurality of branches gathered at an assembling part for assembling the plurality of signal lines of the plurality of branches, wherein the plurality of branches are symmetric about the assembling part;
a plurality of force sensors deposited on the cable frame, the plurality of force sensors sensing touch on the touch glass and then transferring sense signals to the plurality of signal lines of the integrated cable, wherein at least one of the plurality of force sensors comprises a ball elastically touching and facing towards the touch glass, thereby providing motion stroke between the touch glass and the at least one of the plurality of force sensors; and
a liquid crystal module (LCM) configured to receive the sense signals from the assembling part of the integrated cable.

29. The touch panel of claim 28, further comprising a protection scheme disposed on the cable frame, wherein the protection scheme comprises a protection screw and a protection screw nut, wherein a bottom of the protection screw contacts the touch glass in order to prevent the plurality of force sensors from being damaged when a user exerts a force beyond a predetermined amount.

* * * * *